United States Patent

[11] 3,562,479

[72] Inventors Richard N. Karl
Cortland;
Francis A. Bodenheim, Warren, Ohio
[21] Appl. No. 796,498
[22] Filed Feb. 4, 1969
[45] Patented Feb. 9, 1971
[73] Assignee The McKay Machine Company
Youngstown, Ohio

[54] RESISTANCE WELDING APPARATUS
8 Claims, 6 Drawing Figs.
[52] U.S. Cl...................................................... 219/82,
219/86, 219/119
[51] Int. Cl....................................................... B23k 11/06,
B23k 11/30
[50] Field of Search........................................ 219/82,
119, 120, 66, 78, 86

[56] References Cited
UNITED STATES PATENTS
1,282,502  10/1918  Wagner et al.................  219/82

*Primary Examiner*—J. V. Truhe
*Assistant Examiner*—Hugh D. Jaeger
*Attorney*—Williams and Kreske

ABSTRACT: Resistance welding apparatus of the type providing a pair of electrodes between which welding current may be passed through stock disposed between the electrodes. One of the electrodes aforesaid is a roller electrode which bears against and rolls along the stock to be welded and the other is an elongated backup electrode extending in the direction of travel of the roller electrode.

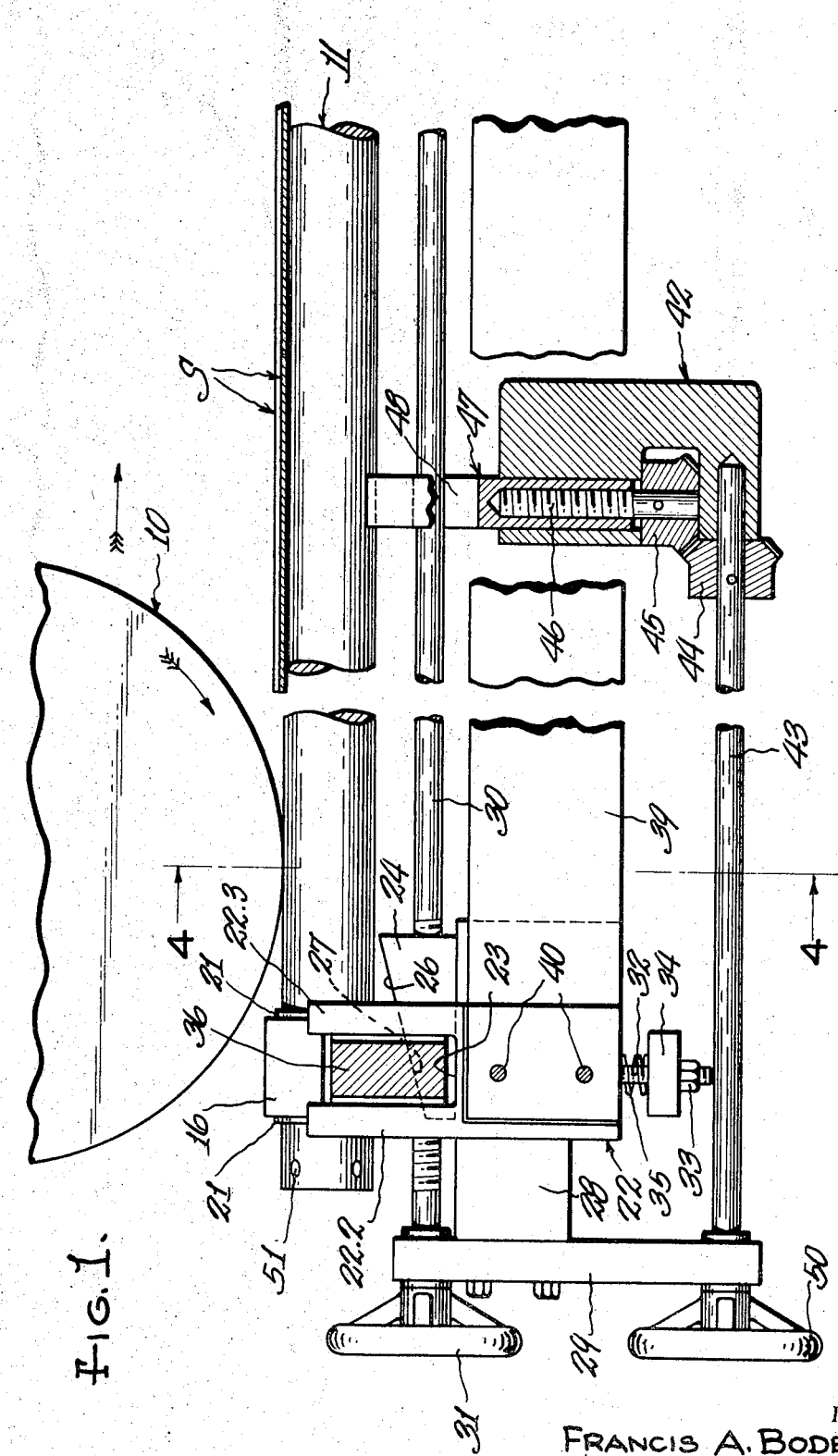

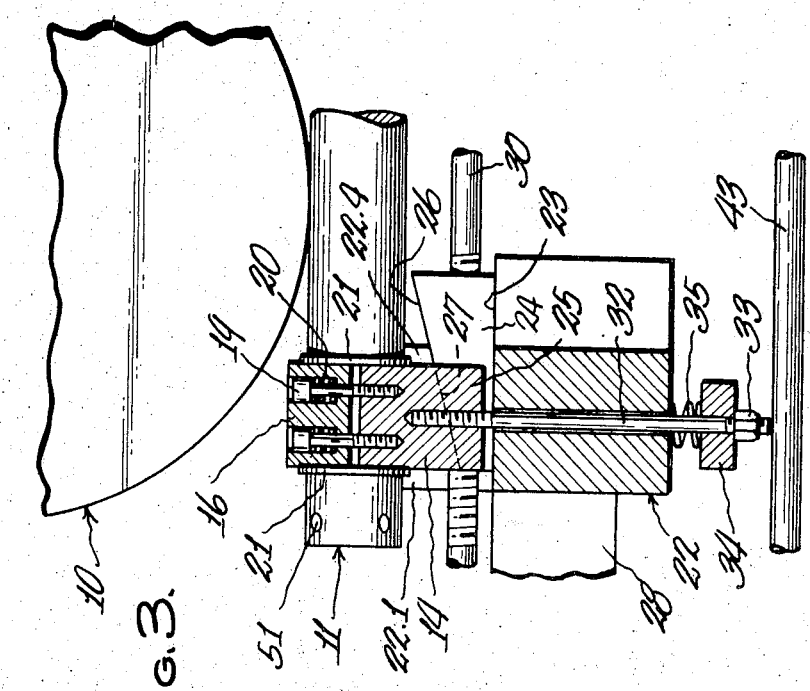
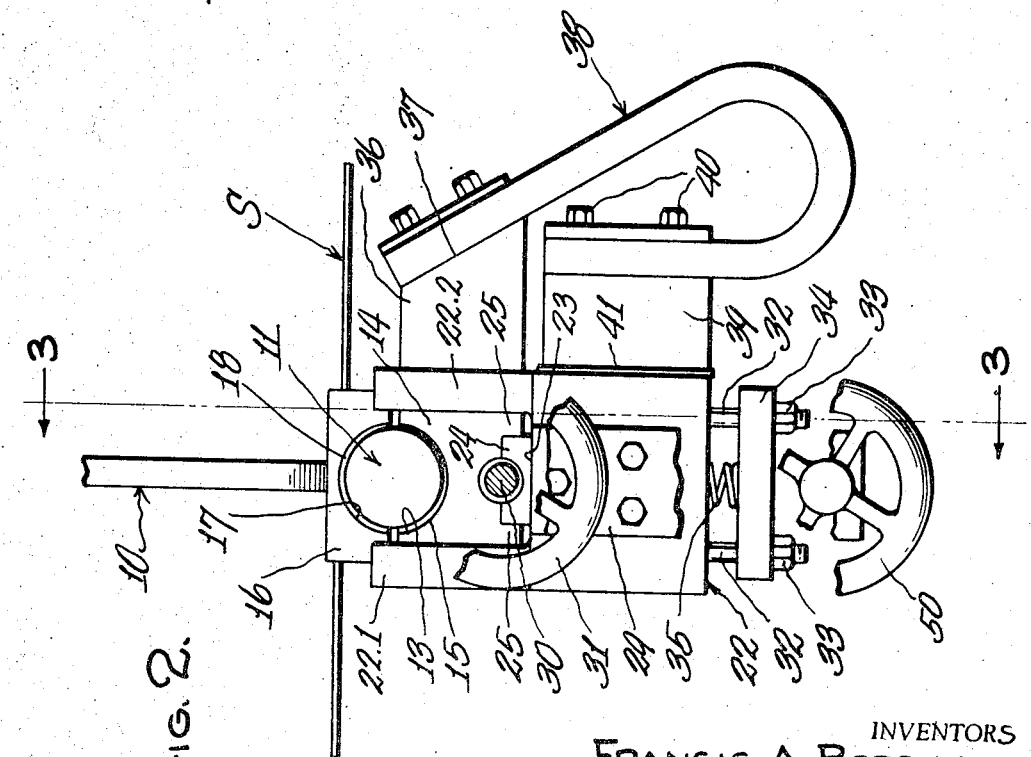
INVENTORS
FRANCIS A. BODENHEIM
and RICHARD N. KARL
By Williams and Kreske
ATTORNEYS

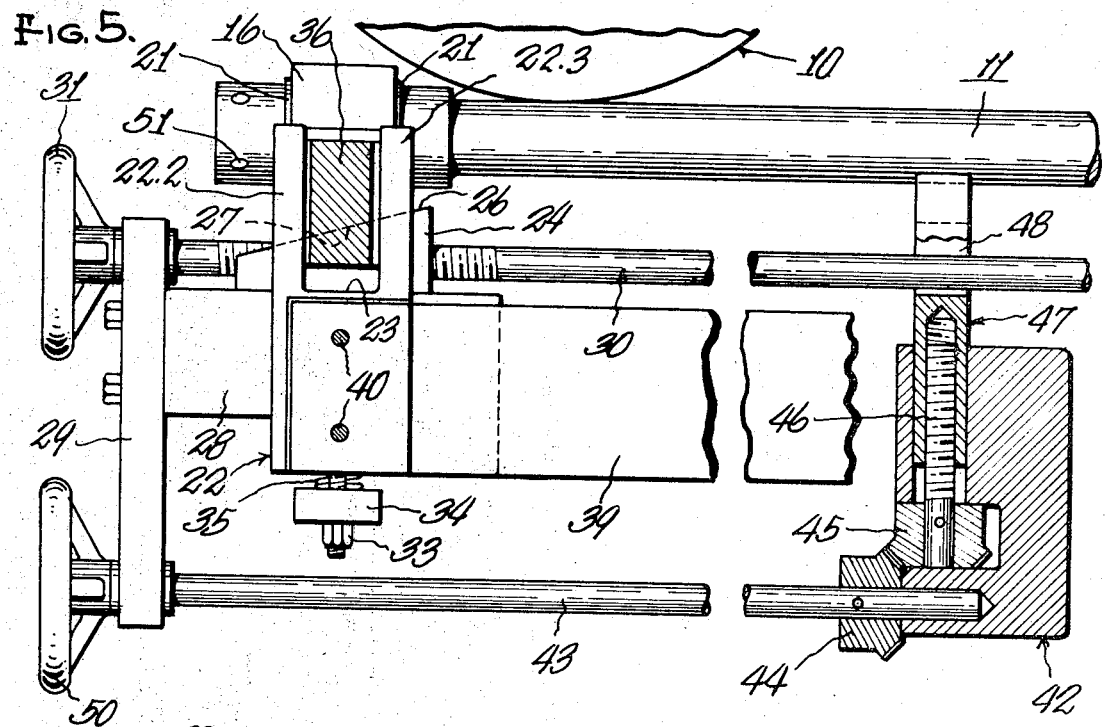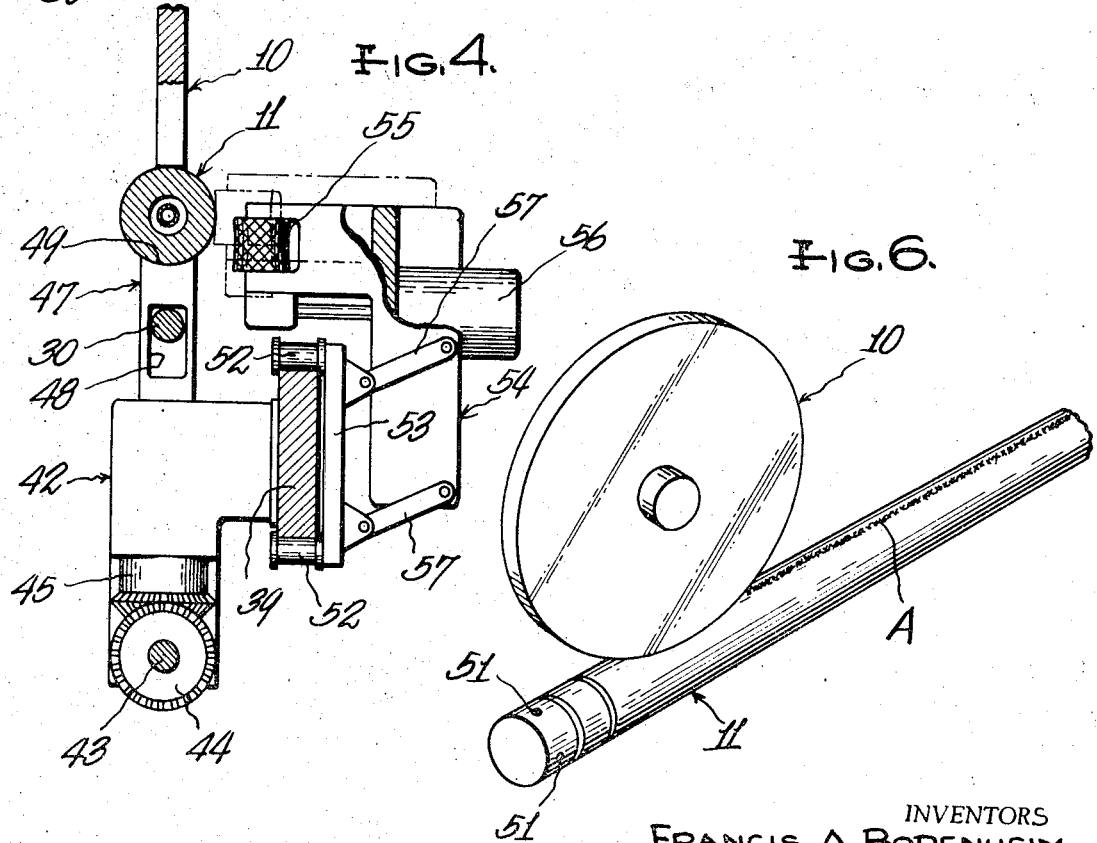

RESISTANCE WELDING APPARATUS

PREAMBLE

While welding apparatus of the type hereinabove described has long been known, prior art apparatus has not been completely satisfactory because of the need for frequent replacement of the backup electrode as it becomes worn and pitted from use. True, some prior art apparatus provided backup electrodes with more than one working surface which could be presented for use; however, the number of available working surfaces was small and the change from one surface to another was relatively difficult and time-consuming resulting in considerable production loss and attendant high manufacturing costs.

SUMMARY

In contrast, the present invention provides apparatus in which a backup electrode provides a multitude of working surfaces which can be presented for use as required in a moment's time by the machine operator without requiring the attendance of a maintenance man or other skilled person. This is accomplished by rotatably mounting the backup electrode between axially spaced members and by frictionally restraining the backup electrode against rotation during normal use. Not only do the frictional supporting members restrain rotation of the backup electrodes, they also provide means by which welding current is fed thereto.

Since the backup electrode may gradually be reduced in transverse size as a result of dressing operations which restore its working surfaces when they are no longer serviceable, the frictional supporting members and the supported backup electrode are selectively movable in a direction toward the roller electrode to maintain a constant pass line of the apparatus despite a decreasing transverse size of the backup electrode.

Cost and space limitations normally dictate a backup electrode which is relatively small in transverse section and, to prevent excessive deflection of the backup electrode under the pressure exerted by the roller electrode, the backup electrode may be supported intermediate the frictional supporting members. Because of the progressive reduction in transverse size of the backup electrode as it is dressed, the intermediate support is selectively movable in a direction toward the roller electrode to properly support the backup electrode despite its decreasing transverse size.

Finally, to facilitate dressing of the backup electrode when its working surfaces are no longer serviceable without necessitating removal of such electrode from its normal use position, an electrode dressing device is provided which is selectively movable toward and away from electrode dressing position and is movable longitudinally of the electrode whereby its entire working length may be dressed.

These and other advantages of the present invention will readily become apparent from a study of the following description and from the appended drawings, and in these drawings:

DRAWING DESCRIPTION

FIG. 1 is a fragmentary side elevational view of apparatus embodying the present invention, portions on the near side being broken away to show the underlying structure;

FIG. 2 is a front elevational view of the apparatus seen in FIG. 1, portions on the near side here again being broken away;

FIG. 3 is a fragmentary sectional view generally corresponding to the line 3–3 of FIG. 2;

FIG. 4 is a transverse sectional view generally corresponding to the line 4–4 of FIG. 1;

FIG. 5 is a view similar to FIG 4 but showing certain parts in another position; and FIG. 6 is a reduced size, perspective view of certain details.

DETAILED DESCRIPTION

With reference to FIGS. 1 and 2, a roller electrode 10 is mounted on any conventional carriage (not shown) for movement from left to right in the position of parts seen in FIG. 1. Underlying roller electrode 10 is a backup electrode 11 which extends along the path of travel of the roller electrode. In Operation, stock S to be welded will be disposed in superposed relation on the backup electrode 11 and the roller electrode 10 will be caused to transverse the stock with a predetermined amount of downward pressure while welding current is caused to flow between the electrodes and through the interpositioned stock.

Since both of the electrodes 10, 11 are normally formed of material having high electrical conductivity such as copper, the working surfaces thereof; that is, the surfaces in contact with the stock which are subjected to heavy current, high temperature and heavy welding pressure, tend to deteriorate quite rapidly. Deterioration of the electrodes' working surfaces results in inferior welds and for this reason, it has long been common practice to provide electrode-dressing means or to otherwise restore the working surface of the electrode.

With respect to the roller electrode 10, much prior art is devoted to apparatus for maintaining the working periphery thereof in optimum conditions and, since it forms no part of the present invention, no means have been shown for maintaining the periphery of roller electrode 10. It will be understood, of course, that any suitable prior art structure may conveniently be used for this purpose.

Moreover, while a roller electrode 10 has herein been disclosed, it is to be understood that a spot-welding electrode and its supporting head could be substituted for the roller electrode and its carriage, such electrode traveling along the stock by intermittent movement and performing a spot-welding operation while its movement aforesaid is arrested. Since the present invention, however, is concerned with maintaining an optimum working surface of the backup electrode 11, this disclosure is primarily directed to the structure which eliminates the problems attendant with the backup electrodes of prior art apparatus.

As herein disclosed, backup electrode 11 is in the form of an elongated bar which, in the preferred embodiment illustrated, is round in cross section. As best seen in FIGS. 1, 2 and 3, one end of electrode 11 is seated in an upwardly facing pocket 13 in a slide member 14. An insert 15 of high electrical conductivity lines the pocket 13 and is configurated to closely fit with the electrode 11. A cap member 16, having a downwardly directed recess 17 is secured to the slide member 14. The recess in cap member 16 is lined with a dielectric insert 18 to electrically insulate the cap member from the electrode. Insert 18, like insert 15, is configurated to closely fit with the electrode 11.

As seen in FIG. 3, cap member 16 is removably secured to the slide member 14 by capscrews 19 having compression springs 20 underlying the capscrew heads. The arrangement is such that while the electrode 11 is firmly gripped between the slide member 14 and the cap member 16, the springs 20 so limit gripping pressure that the electrode may be rotated within the bearing provided by the slide 14 and the cap 16 by the application of sufficient torque to overcome frictional resistance of the bearing. To retain electrode 11 against axial movement, axially spaced retainer rings 21 may be disposed in suitable grooves in the electrode thus providing shoulders which bear against opposed faces of the slide member and its cap member.

Still referring to FIGS. 1, 2 and 3, slide member 14 is vertically slidable in a guide member 22 having upstanding guide legs 22.1, 22.3 and 22.4 at respective corners of the slide member for guiding movement of the latter. Guide member 22 provides a flat surface 23 along which a wedge 24 is slidable between the guide member leg pairs 22.1, 22.2 and 22.3, 22.4. Wedge 24 fits between depending legs 25 of the slide member 14 and inclined surface 26 of the wedge bears against a corresponding inclined surface 27 on the slide member 14. As best seen in FIG. 1, a boss 28 projects forwardly of guide member 22 and secured to such boss is a vertically extending plate 29. Journaled in an upward extension of plate 29 is a threaded shaft 30 which passes between the guidemember leg pairs 22.1, 22.2 and 22.3, 22.4, and has threaded engagement with the wedge 24. A hand wheel 31 provides for rotation of the shaft 30 and thus movement of the wedge 24 along the guide member surface 23.

Means are provided for maintaining slide member 14 seated upon the wedge 24 and as herein disclosed, a pair of elongated studs 32 (see especially FIG. 3) are anchored in the slide member and depend therefrom for extension through respective enlarged apertures in the guide member 22. Secured across the studs 32 by nuts 33 is a crossbar 34 and a compression spring 35 is interposed between the cross bar 34 and the guide member 22 to exert a resilient downward force on the slide member 14.

As best seen in FIGS. 1 and 2, slide member 14 is provided with a boss 36 projecting between the guide member pair of legs 22.2, 22.3 and such boss has an angled face 37 to which one end of a flexible electrical lead 38 is secured. The other end of lead 38 is secured to a rearwardly extending bus bar 39, in turn secured to the guide member 22 by bolts 40. In the usual manner, insulating material 41 may electrically isolate the bus bar 39 from the guide member 22.

Although not shown, the rear or opposite end of backup electrode 11 will be supported in an identical manner as is the end thus far described, the shaft 30 having operable connection with the wedge of such rear assembly whereby rotation of such shaft simultaneously effects identical movement of the front and rear slide members. Accordingly, opposite ends of the backup electrode will be simultaneously raised and lowered by rotation of the hand wheel 31. Moreover, it will be understood that the bus bar 39 is secured to the rear guide member in the same manner as it is secured to the front guide member 22 and a flexible lead identical to lead 38 establishes an electrical connection from the rear of bus bar 39 to the rear slide member. Also not shown is the usual welding transformer which, in an any convenient manner, will have one output lead connected to the bus bar 39 and its other output lead connected to the roller electrode 10.

Since the backup electrode 11 may frequently be of considerable length while its diameter is rather small, means are provided for supporting the intermediate portion of the backup electrode against deflection caused by the roller electrode traveling therealong. As seen in FIGS. 1 and 4, a bracket 42 is secured to the bus bar 39 in any suitable manner which will electrically isolate the bracket from the bar. Rotatably supported by the bracket 42 is one end of a shaft 43 whose other end is journaled in the lower extension of the previously mentioned plate 29.

Affixed to the shaft 43 adjacent the bracket 42 is a miter gear 44 which is meshed with a miter gear 45. Affixed to gear 45 is an upstanding stub shaft 46 whose upper portion has threaded engagement with an upstanding support leg 47 which is vertically slideable within the bracket 42. Support leg 47 is slotted at 48 to clear the previously mentioned shaft 30 and the upper end of the support leg is grooved at 49 to cradle the backup electrode. Affixed to the shaft 43 adjacent the plate 29 is a hand wheel 50 by means of which shaft 43 may be rotated.

From the foregoing, it will be understood that rotation of shaft 43 will, through the miter gears 44, 45 rotate the stub shaft 46 and, since the latter has threaded connection with the support leg 47, will raise or lower the latter as required.

After a number of welding operations have been performed by the apparatus hereinabove described, the precise number being dependent upon the material being welded, the welding current being used, the required quality of weld, and many other factors too varied to enumerate, that portion of backup electrode 11 which immediately underlies the roller electrode 10 (see FIG. 6) will deteriorate, as indicated by the reference character A, to the point where satisfactory welds can no longer be made. When this occurs, a tool may be inserted in one of the holes 51 in the backup electrode 11 and the latter will be rotated an amount sufficient to present an undamaged surface for cooperation with the roller electrode 10. Welding may now proceed until the necessity for exposure of another backup electrode surface arises.

The backup electrode 11 may continue to be indexed as required in the manner above described until such time as the entire usable peripheral surface of the electrode is no longer suitable for use. When this occurs, the backup electrode may be removed from the machine by removing the front and rear cap members 16. Such worn electrode may now be machined by cutting away its damaged periphery. The machined backup electrode may now be reassembled with the machine; however, since its diameter is now less than that of before, as shown somewhat exaggerated in FIG. 5, the electrode will be raised, by rotation of shaft 30, so as to maintain its upper working surface in the same plane as before. With the electrode thus raised, support leg 47 will also be raised, by proper rotation of shaft 43, to supporting relation with the electrode.

Welding may once again proceed, along with periodic indexing of the backup electrode as before described, until such time as the entire, usable peripheral surface of the electrode is once again unsuitable for use whereupon the electrode may be machined once again. The foregoing operations may proceed as required until such time as further machining of the backup electrode is impractical whereupon such electrode will be replaced by a new one.

To reduce still further the necessity for frequent machining of the backup electrode, a dressing device such as shown in FIG. 4 may be incorporated for removing pickup from the electrode such as may be encountered when welding aluminum or tinned, galvanized or otherwise coated metals.

Mounted for movement along the bus bar 39, as by means of flanged rollers 52, is a carriage 53 supporting a housing 54. Such housing mounts an electrode dressing wheel 55 driven by a suitable motor 56. Spaced, parallel links 57, 57 secure housing 54 to the carriage for movement between its full line position wherein the dressing wheel 55 is spaced from the backup electrode to its phantom line position wherein the dressing wheel abuts the electrode. Although not shown, any suitable mechanism may be provided for effecting housing movement aforesaid.

Normally, of course, the dressing device is disposed in its full line position where it will not interfere with welding operations nor with rotation of the backup electrode as previously described. When, however, the device is to be used, motor 56 will be activated to drive the dressing wheel 55 and the housing will be shifted to its phantom line position to engage the electrode with the dressing wheel. Assuming that carriage 53 is positioned adjacent one end of the backup electrode, it will be shifted along the bar 39 to adjacent the other electrode end. During such carriage movement, the rotating dressing wheel 55 will remove a portion of the damaged periphery of the backup electrode to expose a new surface for use. The backup electrode 11 may now be rotated slightly to position another worn or damaged electrode periphery adjacent the dressing wheel 55 and the carriage 53 shifted in the opposite direction to thus dress another portion of the electrode periphery. The operations aforesaid may be continued until the entire periphery of the backup electrode has been restored whereupon the housing 54 will be returned to its full line position to await further use, and welding may resume after the backup electrode 11 and the support 47 have been properly adjusted as hereinabove described.

While the backup electrode 11 has herein been shown and described as being round in cross section, it is to be understood that its working periphery may well provide a plurality of circumferentially spaced flats for cooperation with the roller electrode 10. Thus, such backup electrode may be hexagonal or octagonal in cross section. Of course, it may also be provided with a greater or lesser number of flats as required.

We claim:
1. Resistance welding apparatus, including a pair of electrodes between which welding current may be passed through metal strips disposed therebetween, one of said electrodes overlying said strips and selectively moveable thereagainst with welding pressure and also movable along an elongated seam formed by overlapped edges of said strips to weld the strips along said seam, the other of said electrodes underlying said strips and constituting a backup for said welding pressure, said other electrode being elongated and disposed along the line of said seam, the improvement comprising:

an elongated rigid bus bar underlying said strips and spaced from said other electrode but extending parallel thereto, said bus bar being electrically connected to the secondary of the welding transformer;

a pair of brackets respectively connected to spaced longitudinal parts of said bus bar; and a slide carried by each bracket for vertical adjustment, each slide being connected to said other electrode whereby the latter may be vertically adjusted, the connection between each slide and said other electrode permitting rotation of said other electrode about its longitudinal axis so that various longitudinal faces of said other electrode may be presented to backup and weld said strips along said seam.

2. The construction according to claim 1 wherein said other electrode is round in cross section.

3. The construction according to claim 1 wherein a wedge is held to sliding movement along a surface of each bracket and has an inclined surface engageable with a surface of a respective slide, and means for moving said wedges to cause vertical adjustment of said slides.

4. The construction according to claim 3 wherein a single shaft passes through both of said wedges and has threaded connection with each, said shaft being held against axial movement, and means for rotating said shaft.

5. The construction according to claim 4 wherein a bearing plate is connected to each bracket and provides bearings for opposite ends of said shaft.

6. The construction according to claim 4 and further including means for supporting an intermediate portion of said other electrode against downward deflection which may be caused by said welding pressure, said supporting means comprising a housing, a saddle member adjustable vertically within said housing and having a saddle engaging an undersurface of said other electrode, and a further shaft for effecting vertical adjustment of said saddle member, said shaft being carried by one of said bearing plates.

7. The construction according to claim 1 and means for dressing a longitudinal surface of said other electrode, said dressing means being carried by said bus bar and selectively movable into engagement with a surface of said other electrode.

8. The construction according to claim 7 wherein said dressing means includes a carriage movable along said bus bar.